United States Patent
Ohtomo et al.

(10) Patent No.: US 7,244,807 B2
(45) Date of Patent: Jul. 17, 2007

(54) AROMATIC POLYESTER FILM AND PRODUCTION PROCESS THEREOF

(75) Inventors: Shinji Ohtomo, Tsukuba (JP); Satoshi Okamoto, Tsukuba (JP); Yoshikazu Takahashi, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 11/315,131

(22) Filed: Dec. 23, 2005

(65) Prior Publication Data

US 2006/0142534 A1   Jun. 29, 2006

(30) Foreign Application Priority Data

Dec. 27, 2004   (JP)   ............................. 2004-375922

(51) Int. Cl.
*C08G 63/02*   (2006.01)

(52) U.S. Cl. .................. 528/289; 427/384; 427/487; 428/221; 428/480; 528/176; 528/271; 528/272

(58) Field of Classification Search ............... 428/221, 428/480; 427/487, 384; 528/176, 271, 272, 528/289

See application file for complete search history.

(56) References Cited

U.S. PATENT DOCUMENTS

| 5,534,209 A | * | 7/1996 | Moriya ................. 264/171.13 |
| 6,274,242 B1 | * | 8/2001 | Onodera et al. ......... 428/411.1 |
| 7,014,921 B2 | * | 3/2006 | Okamoto et al. ........... 428/480 |

FOREIGN PATENT DOCUMENTS

| JP | 09-278805 | 10/1997 |
| JP | 2002-284874 | 10/2002 |

OTHER PUBLICATIONS

Takahashi, Yoshikazu et al., "Determination of Evaporation Rate and Vapor Pressure or Organic Monomers Used for Vapor Deposition Polymerization", Jpn. J. Appl. Phys., vol. 32, Pt. 2, No. 6B, (1993), pp. L875-L878.

* cited by examiner

*Primary Examiner*—Terressa Boykin
(74) *Attorney, Agent, or Firm*—Foley and Lardner LLP

(57) ABSTRACT

An aromatic polyester film comprising a polymer having a repeating unit such as a unit derived from 4-hydroxycarboxyphenyl is provided. The film is excellent in heat resistance and solvent resistance and can be obtained by a deposition polymerization method.

4 Claims, 1 Drawing Sheet

AROMATIC POLYESTER FILM AND PRODUCTION PROCESS THEREOF

BACKGROUND OF THE INVENTION

1. Field of the Invention

The invention relates to a wholly aromatic polyester film and a process for producing the wholly aromatic polyester film.

2. Description of the Related Art

The homopolymer of 4-hydroxybenzoic acid, which is a wholly aromatic polyester, has excellent heat resistance, abrasion resistance, compression creep resistance, electric insulation and solvent resistance, and its crystalline structure has plate crystal similar to those of solid lubricants such as graphite and molybdenum disulfide; and therefore the polymers excellent in a self lubricity. However, since it is hardly fluidized at a temperature range of 400° C. or less, the polymer cannot be molded by a general molding method and is mainly used for a filler for polytetrafluoroethylene.

Although the wholly aromatic polyester comprising self-condensing monomers (such as 4-hydroxybenzoic acid and 2-hydroxy-6-naphthoic acid) as raw materials of the polyester has excellent properties, it may be insoluble and not fused and it is known that handling is very difficult.

SUMMARY OF THE INVENTION

Heat resistance and solvent resistance are desired for preparing, for example, a member of a car radiator. The present inventors have extensively studied in applying the wholly aromatic polyester having the above-mentioned excellent properties in such uses for a member. One of objects of the present invention to provide a molded article (such as a film) of a wholly aromatic polyester, which can be applied to such uses, and a production process thereof.

The invention provides an aromatic polyester film comprising a polymer having a repeating unit represented by formula (1) below:

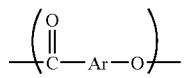

wherein Ar represents a unit represented by a formula below:

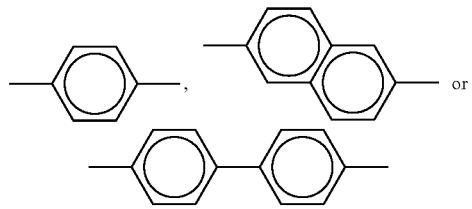

The film of the present invention, which may be an aromatic polyester film, comprises a polymer having a repeating unit represented by the above-mentioned formula (1) and is excellent in heat resistance and solvent resistance. For example, heat resistance and solvent resistance can be imparted to a member of a car radiator when the member is coated with the film.

An aromatic polyester film in the present invention, which may be a wholly aromatic polyester film, can be obtained by the process comprising the steps of evaporating a self-condensing monomer as a raw material in vacuum, and polymerizing the monomer on a surface of a substrate to obtain an aromatic polyester film comprising a polymer having a repeating unit represented by the above-mentioned formula (1). For example, a wholly aromatic polyester film may be produced by a deposition polymerization method in which a self-condensing monomer as a raw material is evaporated in vacuum and polymerized to form the wholly aromatic polyester film on the surface of the substrate.

DETAILED DESCRIPTION OF THE PREFERRED EMBODIMENTS

Figure 1:
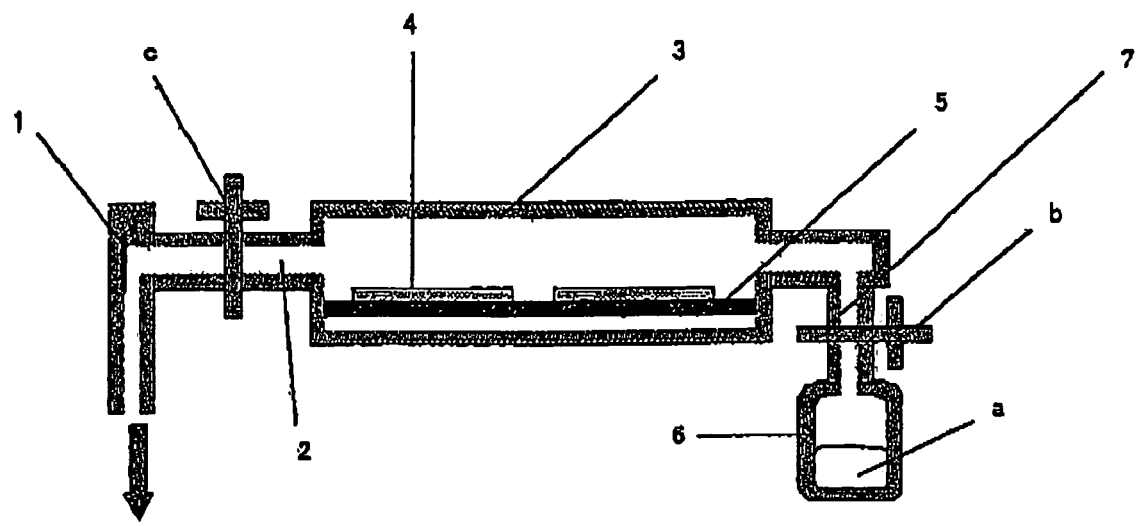
FIG. 1 is a side view of a deposition polymerization device used in Example.

The self-condensing monomer has 2 or more of functional groups in its molecule, and respective functional groups can be mutually reacted. Examples of the monomer include 4-hydroxybenzoic acid, 2-hydroxy-6-naphthoic acid or 4-hydroxy-4'-carboxybiphenyl, or a compound in which a phenolic hydroxy group and/or a carboxyl group in each of the former compounds was modified with a group having an ester-exchange reactivity. Preferable examples of the group having the ester-exchange reactivity include an acyl group. More preferably, the monomer is a compound represented by formula (2) below:

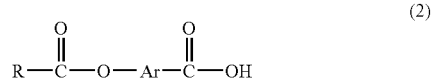

wherein R represents a methyl group, an ethyl group, an n-propyl group or an isopropyl group, and Ar represents:

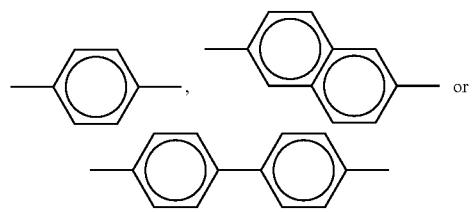

Among these, the reactivity of 4-acetoxybenzoic acid is comparatively high, which can be preferably used from the viewpoint of preparing a film with no or few (if any) defects.

Although 2 or more kinds of self-condensing monomers can be used, one kind of self-condensing monomers is preferably used since the resulting film has a uniform composition.

The lower the initial pressure in a reaction system is and the higher the vacuum is, the less the impurities in the system is, which is preferred. The initial pressure in the system is preferably about 0.005 Torr or less, and is more preferably about 0.002 Torr or less. When the pressure is high, impurities such as moisture are easily contaminated in the resulting film, and there is possibility that the proceeding of polymerization reaction becomes late.

The temperature of substrate surface on which the polymer film is formed is preferably in the range of from about 280° C. to about 340° C., and is more preferably in the range of from about 300° C. to about 320° C. When the temperature is low, reaction speed tends to be lowered. When the temperature is too high, there is possibility that the polymer obtained by the deposition method is thermally decomposed.

Examples of the material for the substrate include glass, SUS, copper, a silicon wafer, aluminum and iron. Preferably, the material is aluminum or glass.

The thickness of the polymer film is preferably about 0.2 μm or more, and is more preferably about 0.8 μm or more. When the thickness is too thin, the film may have inadequate strength, which may be a white fragile film.

One of preferable embodiments of the present invention is illustrated below, referring to the drawings.

The deposition polymerization device of FIG. 1 has a vacuum vessel 3 and a vent 2 and a container 6 for evaporation are provided in the vacuum vessel 3. A vacuum pump not illustrated is connected with the vent 2 and the inside of the vacuum vessel 3 is composed to be able to be evacuated under vacuum. Further, the container 6 for evaporation is composed so as to store a raw material monomer a and a heater (not illustrated) for heating the container 6 for evaporation is prepared.

On the other hand, valves b and C for adjusting the feed amount and discharge amount of the raw material monomer are provided at a raw material introducing tube 7 and the vent 2, respectively.

Further, a hot plate 5 for heating a substrate 4 is provided in the vacuum vessel 3. Accordingly, the vapor of the raw material monomer a is diffused in the vacuum vessel 3 and when it adheres on the surface of the substrate 4, thermal energy is fed for the raw material monomer which is migrated on the substrate 4. On the other hand, vapor discharged from the vent 2 among the vapor of the raw material monomer a is captured at a monomer trap 1.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Application No. 2004-375922 filed on Dec. 27, 2004, including specification, claims, drawings and summary, are incorporated herein by reference in their entirety.

EXAMPLES

The present invention is described in more detail by following Examples, which should not be construed as a limitation upon the scope of the present invention.

An aluminum plate and a glass plate were respectively installed on a hot plate 5 as a support in condition in which valves b and c were closed, they were set in the vacuum vessel 3, and the raw material monomer a (4-acetoxybenzoic acid) was is charged in the container 6 for evaporation. The container 6 for evaporation, the vacuum vessel 3 and the hot plate 5 were respectively set at 260° C., 280° C. and 300° C., and after reaching at set temperatures, the valve c was opened to evacuate the inside of a system (pressure was 0.002 Torr). Then, the valve c was closed and the valve b was opened. After a while, again the valve b was closed and the valve c was opened to evacuate the inside of the vacuum vessel (pressure was 0.002 Torr). After repeating the operation three times, the valve c was closed, the system was released after 60 min from the opening of the valve b, and when the support on the hot plate was taken out, it was confirmed that a wholly aromatic polyester thin film containing 4-acetoxybenzoic acid as a raw material was formed on each of the aluminum plate and glass plate.

Figure 2:
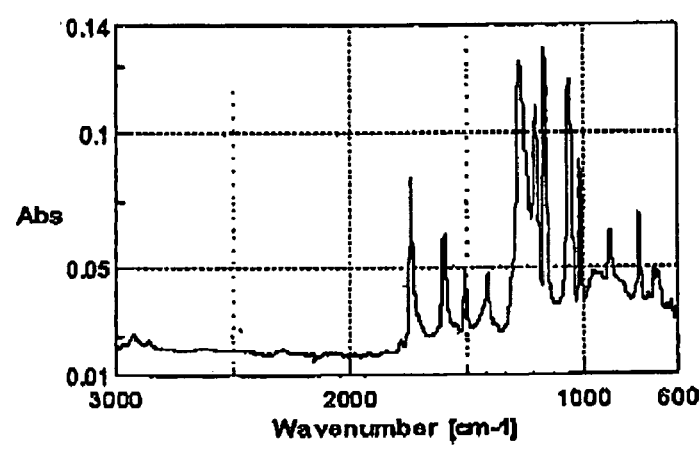
FIG. 2 shows the IR spectrum measurement result of the wholly aromatic polyester film obtained in Example 1.

The IR spectrum measurement result of the polymer film of the wholly aromatic polyester obtained is shown in FIG. 2. In the drawing, absorption at 1730 cm$^{-1}$ is originated in the C=O stretching vibration of an ester bond and absorption at 1050 to 1275 cm$^{-1}$ is originated in the C—O—C stretching vibration of the ester bond. The structure of the polyester was confirmed by these absorptions.

Further, the film thickness of the film obtained was measured with an n & k analyzer 1512RT manufactured by n & k Technology Inc., and it was thereby confirmed that it was a deposition film with an average thickness of 1.0 μm.

What is claimed is:

1. A process for producing an aromatic polyester film, the process comprising the steps of evaporating a self-condensing monomer in vacuum, and polymerizing the monomer on a surface of a substrate to obtain an aromatic polyester film comprising a polymer having a repeating unit represented by formula (1) below:

wherein Ar is a unit represented by a formula below:

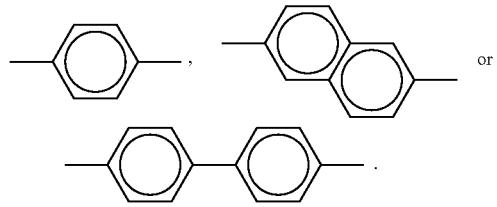

2. The process for producing an aromatic polyester film according to claim 1, wherein the film is formed by setting the surface temperature of a substrate higher than the temperature of the self-condensing monomer.

3. The process for producing an aromatic polyester film according to claim 1, wherein the self-condensing monomer is a compound represented by following formula (2) below

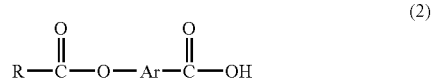

wherein R represents a methyl group, an ethyl group, an n-propyl group or an isopropyl group, and Ar represents a unit represented by a formula below:

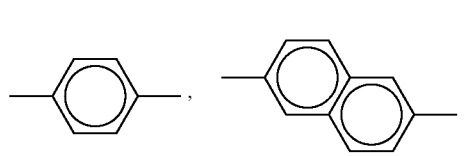or
-continued
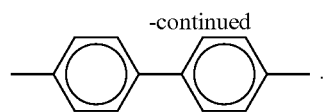.
4. An aromatic polyester film obtained by the production process of claim 1.
* * * * *